Oct. 25, 1960

W. WADE ET AL 2,957,512

METHOD OF PRODUCING ELASTIC
COMPOSITE SHEET MATERIAL
Filed Dec. 24, 1953

United States Patent Office 2,957,512
Patented Oct. 25, 1960

2,957,512

METHOD OF PRODUCING ELASTIC COMPOSITE SHEET MATERIAL

Worth Wade, Rosemont, and Ralph M. Winters, Jr., St. David, Pa., assignors to American Viscose Corporation, Philadelphia, Pa., a corporation of Delaware Filed Dec. 24, 1953, Ser. No. 400,172

3 Claims. (Cl. 154—33.05)

This invention relates to composite laminated structures or bodies and more particularly to such structures or bodies having at least one layer or ply formed of a permeable, reticulated fibrous web of elastomeric material.

Sheet rubber, sponge rubber and foam rubber are desirable for a wide variety of industrial applications because of their properties and characteristics such as their surface properties, impact and shock resistance, thermal conductivity characteristics and resilience. Sheet rubber possesses an inherent disadvantage in its relatively high density, high thermal conductivity and relatively low tensile strength. Calendered rubber sheet possesses a decided grain in the direction of calendering and thus has an appreciably greater strength in the direction of the grain than across the grain. The elasticity in the direction of the grain also differs appreciably from the elasticity across the grain. Sponge rubber and foam rubber although possessed of relatively low density and low thermal conductivity have a low tensile strength, a low impact resistance and a low resistance to abrasion. These forms of rubber also possess a disadvantage of being easily torn or ripped when punctured. The disadvantages are also present in composite structures having at least one ply of the rubber product.

An important class of composite materials containing rubber, namely, elastic fabrics are generally formed of a knitted fabric having at least some of the threads formed of rubber or from thin sheet rubber combined with a stretchable woven or knitted textile. Elastic fabrics formed of rubber thread are relatively costly and involve the preparation of a rubber filament which is generally covered with non-elastic yarns to form a composite thread which is subsequently employed in the preparation of the elastic fabric.

In the manufacture of foundation garments, bathing suits, caps, shoes and the like, rubber sheeting is secured to a reinforcing woven or knitted textile fabric. Although rubber sheeting in itself is desirable for such articles, the sheeting is highly objectionable in that it is substantially impermeable and does not permit a breathing action and the escape of normal perspiration. It is necessary, therefore, to perforate the rubber sheet so as to impart the required permeability. However, such treatment necessarily weakens the sheet and each perforation is a source of a potential tear. In order to prevent tearing and ripping of the sheet, it is combined with a textile fabric. The perforations are generally provided after the woven or knitted textile and the rubber sheet have been joined. The perforating operation damages the knitted textile and the composite sheet must be subjected to further treatment and processing so as to provide a firm bond between the rubber sheet and the textile particularly at the areas of perforation.

For the manufacture of such articles as bathing suits, thin crinkled rubber sheet also has been proposed. However, the sheet is readily punctured and torn and must be reinforced with a textile fabric. This type of composite material, although highly desirable because of its appearance, light weight and the characteristics that it will retain its shape when wet and dries quickly, is highly objectionable in that the material is substantially impermeable. Crinkled rubber sheet and calendered rubber sheet also possess the disadvantage of having appreciably different elasticities and strengths in different directions in the plane of the sheet.

The primary purpose of this invention is to provide an improved composite body including at least one layer or ply of a permeable, reticulated, fibrous web of elastomeric material and having a relatively low density and low thermal conductivity and a relatively high tensile strength and high resistance to abrasion and tearing.

A specific purpose of the present invention is to provide an improved elastic or stretchable composite structure formed of a reticulated, fibrous web of elastomeric material.

A further object of this invention is to provide an elastic or stretchable composite sheet-like structure having a substantially uniform elasticity and strength in all directions in the plane of the sheet.

Another object of this invention is to provide an improved elastic or stretchable composite structure which is relatively inexpensive.

Other objects and advantages of this invention will become apparent from the description and claims which follow.

Figure 1:
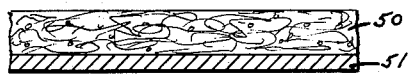
Figures 1 through 6 are diagrammatic sectional views of various embodiments of the composite structures of this invention.

The composite bodies or structures of this invention comprise at least one layer of a permeable, reticulated, fibrous sheet or web of elastomeric material and at least one layer or ply of another material which may be elastic and non-fibrous or substantially non-elastic and fibrous or non-fibrous, or stretchable and fibrous.

In one embodiment, the composite structures of this invention comprise at least one layer or ply of a permeable, reticulated web formed of fibers of an elastomeric material and at least one layer or ply of a non-elastic material which is stretchable and is capable of following the expansion and contraction of the fibrous elastomeric web. In another embodiment, the composite structures comprise at least one layer or ply of a permeable, reticulated web of elastomeric fibers combined with at least one layer or ply of a non-fibrous elastomeric material.

The permeable, reticulated, fibrous web of elastomeric material may be formed according to the method disclosed and claimed in the copending application of Howard O. McMahon and Paul C. Watson, Serial No. 400,240, filed December 24, 1953. In the production of this fibrous web, a liquid dispersion of an elastomeric material is extruded into a primary high velocity stream of gas as a relatively large-diameter stream of plastic. The high velocity stream of gas attenuates and breaks transversely the stream of plastic to form a plurality of discontinuous fibers or fibrils, partially removes the solvent and partially sets the elastomeric material. A secondary stream of gas surrounding the primary stream of gas carries the attenuated fibers and fibrils, removes the remainder of the solvent and continues the setting operation. The attenuated fibers and fibrils are collected on a suitable collecting means and the fibrils become bonded together at their points of contact to provide a reticulated web and the web is then cured or vulcanized. The fibers are deposited in a completely and totally random or haphazard manner thereby forming a closely matted, but permeable sheet. The vulcanized web has a substantially uniform elasticity and strength in all directions in the plane of the sheet. Because of its fibrous structure, the sheet possesses a relatively low density and relatively low thermal conductivity, but the sheet is tough and has a high tensile strength and resistance to abrasion and tearing. Further, the random distribution of the fibers appears to localize any puncture, hole or abrasion and the sheet does not rip or tear upon stretching.

The reticulated, fibrous web is formed of an elastomeric material such as rubber, both natural rubber and synthetic rubber or rubber substitutes, for example crepe rubber, neoprene, chloroprene polymers, butadiene-acrylonitrile copolymers, butadiene-styrene copolymers, isoprene-isobutylene copolymers, organic polysulfides and the like.

The spraying liquid may also contain various additives to impart desired properties and characteristics to the elastomeric fibers. Substances such as normally employed in preparing finished rubber articles from crude natural rubbers or synthetic rubbers may be added, for example, carbon black, curing or vulcanizing agents such as sulfur, accelerators, antioxidants, plasticizers and the like. Coloring agents such as dyes and pigments may be utilized so as to provide the desired color or tint to the fibrous web. Abrasive particles such as emery dust, Carborundum, silica and the like may be added to provide webs having abrasive properties. Fillers such as clay, whiting, kaolin, French chalk and the like may be added to impart desired characteristics and to reduce the cost of the fibrous web.

Composite structures adapted for a wide range of industrial applications and utilizing one or more of the properties and characteristics of the reticulated, fibrous elastomeric bodies, such as the surface properties, impact and shock resistance, low thermal conductivity, relatively low density and high resilience, may be formed by securing the elastomeric body to another body or member. The auxiliary or supplementary member may be an elastic or non-elastic, fibrous or non-fibrous, flexible or rigid, stretchable or non-stretchable body or sheet. The composite structure may be formed by bringing the fibrous elastomeric member and the auxiliary member into contact in the desired relationship prior to curing or vulcanizing the elastomeric material whereby a bond is formed between the members, and subsequently curing or vulcanizing the elastomeric material to form a permanent attachment of one member to the other, more or less pressure may be applied before or during vulcanizing to facilitate bonding. Alternately, a suitable adhesive such as a rubber adhesive may be applied to the surfaces of the members after the elastomeric material has been cured or vulcanized and the adhesive cured after bringing the members together in the desired relationship.

As illustrated in Figure 1, the basic composite structure consists of a layer or ply 50 of the permeable, reticulated fibrous web of elastomeric material and a layer or ply 51 of the other material. The elastomeric material member 50 may be of any desired thickness. For example, where only the surface properties of the elastomeric material member are to be utilized in the composite structure, the ply or layer 50 may be relatively thin, whereas, if the high resilience or impact resistance is to be utilized, as in the manufacture of furniture, cushions and the like, the layer 50 may be relatively thick. The specific elastomer and the composition including additives may be selected to provide desired characteristics.

Similarly, the thickness of the auxiliary material layer or ply 51 may be varied depending upon the desired properties and intended uses for the particular composite structure.

The specific material selected for the auxiliary layer or ply 51 will also be selected for the properties and characteristics dictated by the prospective uses of the composite structure. This layer or ply may be formed of flexible, non-stretchable, fibrous materials such as a paper or pulp sheet or body, felts, paper-like sheets or bodies formed of asbestos, glass or mineral fibers, leather, non-woven textiles, and the like; or rigid, substantially solid materials such as metal, wood, wallboard, ceramic tile, plastic tile, stone (natural and artificial) and the like; or flexible, non-stretchable, non-fibrous materials such as a layer or film of a resin material, a cellulose derivative, cellophane and the like; or flexible, stretchable, non-fibrous materials such as rubber sheet, rubber latex layer, foam rubber, sponge rubber, elastic silicones and the like. For example, a composite body particularly well suited for upholstery purposes such as padding for arms of chairs and davenports, or around sharp edges may be produced by bonding a layer of the reticulated, fibrous web to a layer of sponge or foam rubber. The fibrous web imparts a high tensile strength and tear resistance while the sponge or foam rubber imparts the characteristic softness.

Figure 2:

A further class of supplementary material for a wide range of industrial applications includes textile fabrics formed of natural or artificial or synthetic fibers and filaments such as cotton fabrics, rayon fabrics, glass and mineral fiber fabrics and the like. As shown in Figure 2, the composite body or structure may comprise a layer or ply 50 of the reticulated, fibrous web of elastomeric material bonded to a layer or ply 52 of a woven fabric. Alternatively, the composite structure may comprise exterior layers 50 of the fibrous web of elastomeric material and an interposed layer 52 of the woven fabric, Figure 3, or may comprise exterior plies 52 of the woven fabric and an interposed ply 50 of the fibrous web of elastomeric material, Figure 4. The specific structure and the thickness of the layers will be selected for the desired characteristics and intended uses of the composite structure. Alternatively, the woven fabric ply or plies 52 may be replaced with a knitted fabric ply 53 as shown in Figure 5.

Figure 6:

A further class of composite structures of wide application is illustrated in Figure 6. This structure comprises a fibrous web 50 of elastomeric material bonded to a needled or pile fabric 54 such as a rug or carpet material. The advantages of this type of composite structure are that the elastomeric web serves as a cushion, is highly resistant to tearing, is resistant to moths, insects and mildew and also prevents the rug or carpet from sliding on the floor surface. It is also advantageous in the laying and positioning of the rug since there is no separate positioning of the cushion and the subsequent tedious positioning of the rug to properly register with the cushion.

In the production of the types of composite structures as illustrated in Figures 2 through 6, the laminates or layers are bonded together while the fibrous web 50 of elastomeric material is maintained in a relaxed condition. The auxiliary material layer or ply may be in a relaxed or normal condition or may be under a slight tension. The composite structure is substantially non-stretchable and is adapted for uses wherein the structure desired is of fixed dimensions.

Composite structures utilizing the uniform elasticity and high tear resistance characteristics of the reticulated, fibrous webs of elastomeric material may be formed by utilizing an auxiliary or supplementary layer or ply which is stretchable and capable of following the expansion and contraction of the fibrous web of elastomeric material. An elastic composite structure may be formed, as described hereinbefore, by bonding together a layer of ply 50 of the fibrous web of elastomeric material and a layer of ply 51 of a non-fibrous elastic sheet such as rubber or a rubber substitute. Alternatively, depending upon the contemplated uses of the elastic composite structure, exterior plies of the fibrous web of elastomeric material may be employed with an interposed rubber ply, or exterior plies of the rubber sheet may be provided with an interposed fibrous web of elastomeric material. Where the composite structure must be impervious to the penetration of fluids, such as gases, water vapor or liquids, the elastomeric sheet is also secured to the edges of the fibrous web so as to completely seal the fibrous web within an impermeable envelope.

Figure 7:
Figures 7 through 11 are diagrammatic sectional views of various embodiments of elastic composite structures of the present invention.

Elastic structures of limited stretchability may be produced by utilizing a fibrous or non-fibrous supplementary material ply as illustrated in Figures 7 through 11. In the structure shown in Figure 7, the fibrous web 50 of elastomeric material is bonded at spaced areas or lines 56 to a ply 55 of a creped or corrugated, flexible sheet material, for example, paper, a synthetic resin material in sheet or film form such as vinyl type resins, polyethylene and the like, cellulose derivatives such as cellulose esters or ethers, cellophane and the like, and elastomeric sheets such as sheet rubber or synthetic rubber. Where the supplementary material ply is formed of a non-stretchable sheet material such as a sheet of a synthetic resin material, cellophane and the like, the stretchability is limited, of course, by the slack imparted to the non-stretchable sheet by the corrugations or creping. Stretchability in all directions may be obtained by creping or corrugating the supplementary material sheet in two directions, namely, longitudinally and transversely of the sheet. The composite structure may be produced by assembling the fibrous web of elastomeric material in relaxed condition or under slight tension and the supplementary material sheet in corrugated condition and bonding the plies together at spaced points or areas. The bonding is effected as described hereinbefore. Alternatively, the sheet material ply may be flat and in relaxed condition and the fibrous web of elastomeric material of smaller area may be placed under tension to distort or stretch it so as to conform in area to the area of the sheet material and the plies bonded together at spaced points or areas. Upon allowing the fibrous elastomeric ply to relax, the composite body assumes the structure as illustrated in Figure 7.

Figure 8:

In the form of composite structure shown in Figure 8, both plies are corrugated or creped. The supplementary material ply 57 may be formed of a permeable, non-stretchable, fibrous material and is corrugated or creped in its final production step. The fibrous elastomeric web 58 may be formed by depositing the fibers on the ply 57 and subsequently curing or vulcanizing the elastomer.

Figure 9:
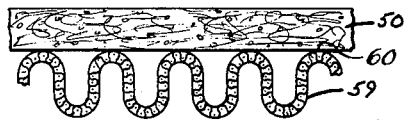
Figure 10:
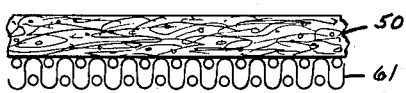
Figure 11:
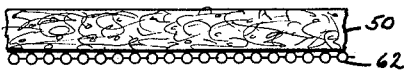

Elastic or stretchable composite structures also may be formed from woven or knitted textiles and the fibrous webs of elastomeric material as illustrated in Figures 9, 10 and 11. The fibrous web 50 of elastomeric material is bonded at spaced points or areas 60 to a woven fabric 59. The woven fabric may be corrugated, pleated, creped or bunched prior to bonding, or the fabric may be in relaxed condition while the elastomeric material ply of smaller area is maintained under tension to distort or stretch it so as to conform in area to the area of the fabric and the plies bonded together at the desired spaced locations. Longitudinal or longitudinal and transverse stretchability are obtained, as desired, by the application of longitudinally applied tension or longitudinally and transversely applied tensional forces, respectively, during the bonding operation. Obviously, the textile ply may be of a knitted construction, if desired.

Composite structures of more limited stretchability may be formed as shown in Figures 10 and 11. In forming the structure as illustrated in Figure 10, the woven fabric 61 is maintained in relaxed condition or taut while the fibrous web 50 of elastomeric material is placed under tension and the plies bonded together. Upon relaxation of the fibrous elastomeric web or sheet, the woven fabric is compressed in the plane of the fabric thereby causing the threads to be forced closer together. In a like manner composite structures may be produced of a fibrous web 50 of elastomeric material and a knit textile ply 62, as illustrated in Figure 11. It is apparent that in the structures shown in Figures 7, 9, 10 and 11 the normal area of the supplementary material ply or sheet is greater than the normal area of the fibrous elastomeric material ply, the normal area being that area of the sheet or ply when it is placed under slight tension so as to maintain the ply flat without stretching the fibers or filaments.

Figure 3:
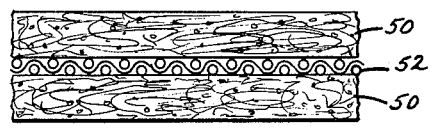
Figure 4:
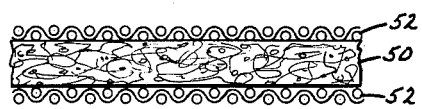
Figure 5:

Although for purposes of illustration the elastic or stretchable composite structures are shown as consisting of a single ply of the fibrous web of elastomeric material and a single ply of stretchable or expansible supplementary material, the stretchable composite bodies may be of a structure similar to that of Figures 3 and 4. The composite may consist of outer layers or plies of the fibrous web of elastomeric material with an interposed layer or ply of the expansible textile fabric, or of outer layers or plies of the expansible textile fabric and an interposed layer or ply of the fibrous web of elastomeric material. The thickness of the fibrous web of elastomeric material may be varied to suit the conditions of use.

In the manufacture of elastic fabrics from perforated rubber sheet and a knit or woven fabric, it is esesntial to bond the rubber sheet and the textile fabric over their entire areas so as to prevent tearing of the rubber sheet at the perforations. In the production of the composite elastic fabrics or structures of this invention, the fibrous reticulated web and the textile fabric need be bonded together only at spaced areas without the risk of tearing of the elastomeric web if it should become punctured. The ability to secured the elastomeric sheet or web to the textile at spaced areas has the further advantage of permitting fuller realization of the uniform elasticity characteristics of the elastomeric sheet.

The elastic composite structures of this invention are particularly advantageous as compared to the usual types of elastic fabrics in that they permit a breathing action comparable to that of knit or woven textiles without the necessity of perforating the sheet after forming. The composite sheet-like structures are permeable over their entire areas, whereas the permeability of the usual types of elastic fabrics of sheet rubber and a fabric is localized at the perforations. The composite structures as herein disclosed have substantially the same elasticity and strength in all directions and do not exhibit the usual grain characteristics which are inherent in calendered rubber sheet materials.

The elastic fabrics or composite structures are particularly well suited for the manufacture of foundation garments, bathing garments, elastic stockings, ankle braces, belts, garters, galluses and the like.

The porosity and permeability of the fibrous web may be reduced and controlled by backfilling, coating or impregnating the web with suitable materials such as rubber latex, preferably before vulcanizing, resinous substances, for example, silicone resins, vinyl type resins and the like, cellulose derivatives, casein, gelatin, starch, clay and other fillers. The specific reduction in porosity and the specific material utilized as the coating or impregnating material will be governed by the intended use of the product.

Figure 12:
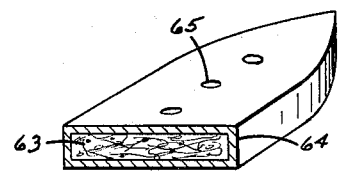
Figure 12 is a perspective view, partly in section, of a belt formed in accordance with this invention.
Figure 13:
Figure 13 is a sectional view of a further form of belting material formed in accordance with this invention; and, Figure 14 is a diagrammatic sectional view of another form of composite structure of this invention.

For example, in the production of men's and boy's belts, suspenders and the like, a reticulated, fibrous web of elastomeric material of the desired width and length is very satisfactory because of its high tear resistance and elasticity. The porosity is unimportant and might be considered a disadvantage in that the belt becomes soiled readily. For such purposes, the fibrous web 63 may be provided with a coating or surface layer 64 of rubber latex or like material so as to form a continuous impermeable surface layer as shown in Figure 12. The usual apertures 65 may be formed without danger of tearing of the web by the buckle tongue, however, it is not necessary to provide the apertures because the user may readily force a buckle tongue through the web at any desired location. For other purposes, such as garter straps, watch bands and the like, it may be desirable to also utilize the high slip resistance of the surface of the reticulated, fibrous web. As illustrated in Figure 13, the fibrous web 66 of the desired width is provided with a surface coating or layer 67 on one longitudinal side and its edges while maintaining the reticulate surface on the other longitudinal side which is placed in contact with the skin.

Figure 14:
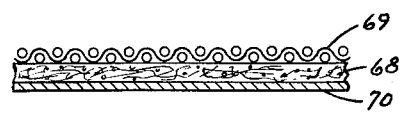

For other purposes, it may be desired to only reduce the permeability or porosity of the reticulated, fibrous web and in such instances the coating or impregnation is limited or controlled accordingly. For example, a wrapping material for use as a shroud for freshly-slaughtered and skinned lamb and veal carcasses may consist of a composite sheet-like structure as illustrated in Figure 14. A relatively thin permeable, reticulated, fibrous web 68 of an elastomeric material such as rubber is bonded to a layer or ply 69 of an absorbent textile fabric such as a knitted cotton or rayon fabric. Since one of the purposes of the shroud is to mold and retain the animal fat in desired position, the fibrous web and textile fabric are bonded together so as to form a composite sheet of limited elasticity which aids in molding the fat before it has been chilled. The porosity of the wrapper should be limited, for example, its porosity is preferably such that it will transmit from about 100 grams to about 300 grams of water vapor per square meter of surface at a relative humidity of 50%. The porosity of the fibrous web may be provided with a somewhat porous rubber layer or ply 70 on the outer surface. The layer 70 may be formed by coating or backfilling the fibrous web with a rubber latex from which the rubber is deposited thereby partially filling or closing the interstices in the fibrous web to provide the desired porosity or vapor transmission.

The elastomeric or rubbery surface does not readily slide over the skin but tends to seize or cling to the skin causing discomfort in putting on such an article. For such articles as foundation garments, bathing garments and the like which must slide over the skin, it is desirable to provide an inner ply or lining of a textile fabric or a layer of flocked fibers. For such articles as garters, belts, suspenders and the like, the fibrous rubbery surface may be desirable. Thus, the particular arrangement of the plies may be selected according to the properties desired in the product.

Since variations and modifications may be made in carrying out the invention, without departing from its spirit and scope, it is to be understood that the invention is not to be limited except as defined in the appended claims.

We claim:

1. The method of producing elastic composite sheet material which comprises placing under tension longitudinally and transversely a permeable, reticulated, fibrous web of elastomeric material, the fibers being in random distribution and bonded together at their points of contact, and bonding thereto at spaced areas a flexible sheet material, the normal width and breadth of the flexible sheet being greater than the normal width and breadth of the fibrous web, the amount of tension being sufficient to distort the fibrous web to conform to the area of the flexible sheet material.

2. The method as defined in claim 1 wherein the flexible sheet material is a non-elastomeric textile fabric.

3. The method as defined in claim 1 wherein the flexible sheet material is a non-fibrous elastic material.

References Cited in the file of this patent

UNITED STATES PATENTS

| 2,031,703 | Galligan et al. | Feb. 25, 1936 |
| 2,059,747 | Roberts | Nov. 3, 1936 |
| 2,405,521 | Rowe | Aug. 6, 1946 |
| 2,464,301 | Francis | Mar. 15, 1949 |
| 2,476,282 | Castellan | July 19, 1949 |
| 2,543,101 | Francis | Feb. 27, 1951 |
| 2,723,934 | Morris et al. | Nov. 15, 1955 |

FOREIGN PATENTS

| 804,987 | France | Aug. 17, 1936 |